US010683869B2

(12) United States Patent
Sano et al.

(10) Patent No.: US 10,683,869 B2
(45) Date of Patent: Jun. 16, 2020

(54) FILTER WITH INTEGRATED HEATER, AND ROTARY MACHINE SYSTEM

(71) Applicant: MITSUBISHI HEAVY INDUSTRIES COMPRESSOR CORPORATION, Tokyo (JP)

(72) Inventors: Yusaku Sano, Hiroshima (JP); Jun Nagashima, Hiroshima (JP); Masahiro Hayashi, Hiroshima (JP); Tomoaki Takeda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 345 days.

(21) Appl. No.: 15/561,928

(22) PCT Filed: Apr. 2, 2015

(86) PCT No.: PCT/JP2015/060490
§ 371 (c)(1),
(2) Date: Sep. 26, 2017

(87) PCT Pub. No.: WO2016/157502
PCT Pub. Date: Oct. 6, 2016

(65) Prior Publication Data
US 2018/0119704 A1    May 3, 2018

(51) Int. Cl.
*B01D 35/16* (2006.01)
*F04D 17/10* (2006.01)
(Continued)

(52) U.S. Cl.
CPC .......... *F04D 29/083* (2013.01); *B01D 45/16* (2013.01); *B01D 46/4263* (2013.01); *B01D 50/002* (2013.01); *F04D 29/124* (2013.01); *F04D 29/582* (2013.01); *F04D 29/706* (2013.01); *F04D 17/10* (2013.01)

(58) Field of Classification Search
CPC .. B01D 50/002; B01D 35/16; B01D 46/4263; F04D 29/083; F04D 29/124; F04D 29/706; F04D 29/582; F04D 17/10
(Continued)

(56) References Cited

U.S. PATENT DOCUMENTS 3,874,676 A * 4/1975 Taylor ..................... F01D 11/00
277/422
6,398,484 B1 * 6/2002 Orikasa ................. F04D 29/124
415/111
(Continued)

FOREIGN PATENT DOCUMENTS

DE    102013104102 A1   10/2013
GB       1468352 A        3/1977
(Continued)

OTHER PUBLICATIONS

International Search Report issued in corresponding International Application No. PCT/JP2015/060490 dated Jun. 30, 2015, with translation (4 pages).
(Continued)

Primary Examiner — Minh Chau T Pham
(74) Attorney, Agent, or Firm — Osha Liang LLP

(57) ABSTRACT

A filter with an integrated heater takes in a portion of a fluid of a rotary machine or an external fluid and generates a seal gas that seals the fluid in the rotary machine. The filter with an integrated heater includes: a casing that includes suction port and an ejection port; a filter main body disposed in the casing; and a heater disposed between the filter main body and the ejection port in the casing. The suction port takes in the portion of the fluid or the external fluid from the rotary machine, the ejection port ejects the fluid or the external fluid, and fluid or the external fluid from the suction port passes through the filter main body.

8 Claims, 6 Drawing Sheets

(51) Int. Cl.
  *F04D 29/08* (2006.01)
  *F04D 29/12* (2006.01)
  *B01D 45/16* (2006.01)
  *B01D 46/42* (2006.01)
  *B01D 50/00* (2006.01)
  *F04D 29/58* (2006.01)
  *F04D 29/70* (2006.01)

(58) Field of Classification Search
  USPC ......... 55/337, 315, 317, 318, 320, 325, 327,
  55/328, 331, 332, 423, 486, 459.1,
  55/DIG. 17; 95/268, 269, 271;
  415/169.1, 111, 112, 176, 177, 180, 230,
  415/24
  See application file for complete search history.

(56) References Cited

U.S. PATENT DOCUMENTS

| | | |
|---|---|---|
| 6,524,059 B1 | 2/2003 | Nogiwa |
| 8,663,352 B2* | 3/2014 | Sczesny ................. B01D 45/12 55/315 |
| 2007/0147988 A1* | 6/2007 | Ito ........................... F01D 11/04 415/169.1 |
| 2009/0282973 A1* | 11/2009 | Nakamura ........... B01D 53/002 95/39 |
| 2010/0107613 A1* | 5/2010 | Masuda ................. B01D 46/24 60/297 |
| 2012/0093643 A1 | 4/2012 | Alfes |
| 2013/0170961 A1* | 7/2013 | Meucci ................... F01D 25/22 415/170.1 |
| 2019/0003597 A1* | 1/2019 | Nakasaki ................. F16J 15/44 |
| 2019/0271325 A1* | 9/2019 | Masuda ............... F16J 15/4472 |

FOREIGN PATENT DOCUMENTS

| | | |
|---|---|---|
| JP | H06-108823 A | 4/1994 |
| JP | 3979091 B2 | 9/2007 |

OTHER PUBLICATIONS

Written Opinion of the International Searching Authority issued in corresponding International Application No. PCT/JP2015/060490 dated Jun. 30, 2015, with translation (6 pages).

* cited by examiner

FILTER WITH INTEGRATED HEATER, AND ROTARY MACHINE SYSTEM

TECHNICAL FIELD

The present invention relates to a filter with an integrated heater that generates a seal gas which is used by a gas seal device of a rotary machine and a rotary machine system that includes a filter with an integrated heater.

BACKGROUND

In some cases, a gas seal device is disposed in a rotary machine, such as a centrifugal compressor compressing a process gas as a fluid, so that leakage of the process gas to the outside of the machine is suppressed.

This gas seal device is disclosed in, for example, PTL 1.

Specifically, the gas seal device is disposed in a shaft end portion of a rotary shaft and is provided with a rotary ring and a stationary ring. The rotary ring is integrated with the rotary shaft in an outer peripheral portion of the rotary shaft, and the stationary ring is fixed to a casing and disposed to face the rotary ring in an axial direction of the rotary shaft. The stationary ring is pressed against the rotary ring by a spring. As a result, the stationary ring and the rotary ring collide with each other and a state where no gap is present is reached in a state where the rotary machine is stationary. Because a spiral-shaped groove is formed in a surface of the rotary ring that faces the stationary ring, a seal gas is introduced into the spiral-shaped groove once the rotary machine is put into operation and the rotary shaft rotates. Because of the pressure of this gas, the stationary ring is pressed along the axial direction of the rotary shaft against the biasing force of a coil spring, and then a minute gap is formed between the rotary ring and the stationary ring. Wear attributable to contact between the rotary ring and the stationary ring is suppressed by this gap, the amount of leakage of the seal gas from the gap is kept at its minimum, and the process gas is sealed in the rotary machine.

In some cases, the seal gas that is introduced into the gas seal device is generated by means of some of the process gas from the compressor. In this case, the process gas is passed through a filter, and then it becomes the seal gas by foreign matter being removed from the process gas. Depending on composition, the process gas is highly likely to be liquefied, and thus the temperature of the gas that has passed through the filter is raised by a heater, to at least a dew point temperature, in some cases.

Patent Literature

[PTL 1] Japanese Patent No. 3979091

These days, the temperature of the gas that has passed through the filter is required to be raised by the heater in an increasing number of cases. A unit including the heater, however, is installed by being added to the existing gas seal device, and thus the additional installation is not easy in a case where there is a constraint in terms of installation space. Besides, space-saving effects have rarely been achieved so far by methods for additional heater unit installation.

SUMMARY

One or more embodiments of the present invention provide a filter with an integrated heater with which a space-saving effect can be achieved and a rotary machine system that includes the filter with an integrated heater.

A filter with an integrated heater according to one or more embodiments of the present invention is a filter with an integrated heater taking in a portion of a fluid of a rotary machine or an external fluid and generating a seal gas for performing sealing of the fluid in the rotary machine, the filter with an integrated heater including a casing where a suction port and an ejection port are formed, the suction port taking in the portion of the fluid or the external fluid from the rotary machine and the ejection port ejecting the fluid or the external fluid, a filter main body disposed in the casing, the fluid or the external fluid from the suction port passing through the filter main body, and a heater disposed between the filter main body and the ejection port in the casing.

According to this filter of one or more embodiments with an integrated heater, foreign matter is removed from the fluid by the fluid (or the external fluid) taken into the casing passing through the filter main body, and then the temperature of the fluid is raised by the heater. Accordingly, the fluid can be ejected from the ejection port in a state where it is maintained at a temperature that is equal to or higher than a dew point temperature. Accordingly, the fluid ejected from the ejection port can be used as the seal gas for performing the sealing of the fluid in the rotary machine.

When the seal gas is generated, the filter with an integrated heater is used that integrally accommodates the filter main body and the heater in the casing. Accordingly, the filter main body and the heater do not have to be installed in different spaces.

In the filter with an integrated heater according to one or more embodiments of the present invention, the filter main body described above may have a cylindrical shape about an axis, the suction port may be open toward an inner portion of the filter main body on one side of the filter main body in a direction of the axis, and the heater may be disposed to cover the filter main body from an outer periphery side.

In one or more embodiments, since the cylindrical filter main body is disposed and the filter main body is covered by the heater, the fluid (or the external fluid) is supplied to the inner portion of the filter main body and this fluid passes radially outwards from the filter main body from the inner portion of the filter main body. Then, the temperature of this fluid is raised by the heater placed on the outer periphery side of the filter main body. After the temperature is raised, the fluid becomes the seal gas and is ejected to the outside of the casing from the ejection port.

In one or more embodiments, by the filter main body being covered by the heater as described above, the fluid that has passed through the filter main body can be firmly in contact with the heater and liquefaction attributable to a decline in the temperature of the ejected fluid can be suppressed. Accordingly, the rotary machine is capable of exhibiting a sufficient seal effect by the fluid ejected from the filter with an integrated heater being used as the seal gas.

In the filter with an integrated heater according to one or more embodiments of the present invention, the heater described above may have a shape of a spiral line twisted from one part of the axis toward the other part of the axis toward one part of the filter main body in a circumferential direction and may be disposed to cover the filter main body from the outer periphery side.

In one or more embodiments, by the linear heater being placed in a spiral shape on the outer periphery side of the filter main body as described above, the heater can be installed with ease and the temperature of the fluid (or the external fluid) that has passed through the filter main body can be raised with reliability. Accordingly, the effect of suppressing condensation of the fluid can be enhanced. The rotary machine is capable of exhibiting a sufficient seal effect by the fluid ejected from the filter with an integrated heater being used as the seal gas.

In the filter with an integrated heater according to one or more embodiments of the present invention, the heater described above may have a cylindrical shape about the axis.

In one or more embodiments, by the cylindrical heater being used as described above, a wide range of an outer peripheral surface of the filter main body can be covered. Accordingly, the area of contact between the heater and the fluid (or the external fluid) that has passed through the filter main body can be increased and the temperature of the fluid can be raised with reliability by the heater. As a result, the effect of suppressing condensation of the fluid can be enhanced.

In the filter with an integrated heater according to one or more embodiments of the present invention, the filter with an integrated heater described above may further include a partition member placed between the filter main body and the heater in the casing with a gap present between the filter main body and the partition member and interrupting a flow of the fluid or the external fluid from the filter main body to the heater.

In one or more embodiments, the fluid (or the external fluid) does not directly head for the heater and the ejection port after passing through the filter main body since the partition member is disposed as described above and the flow of the fluid is temporarily interrupted by the partition member. At this time, the fluid that has passed through the filter main body heads for the heater after circulating to spread along a surface of the partition member.

Accordingly, in one or more embodiments, the fluid that has passed through the filter main body can be spread over a wider range in the casing, and the fluid that has passed through the filter main body is allowed to come into contact with a wider range of the heater. Accordingly, the area of contact between the heater and the fluid can be increased and the effect of the rise in the temperature of the fluid can be enhanced. As a result, the effect of suppressing condensation of the fluid can be enhanced.

The filter with an integrated heater according to one or more embodiments of the present invention may further include an inside heater disposed on the filter main body side, which is an inner side of the partition member described above.

In one or more embodiments, the temperature of the fluid (or the external fluid) that has passed through the filter main body can be raised in two stages by the inside heater and the heater. Accordingly, the size of the heater does not have to be increased even in a case where the amount of increase in temperature that is required for the fluid increases. In addition, the effect of a decline in the temperature of the fluid during the circulation of the fluid along the surface of the partition member can be reduced, and thus the effect of the rise in the temperature of the fluid can be improved.

In the filter with an integrated heater according to one or more embodiments of the present invention, the filter with an integrated heater described above may further include a liquid separation unit removing a liquid from the fluid or the external fluid supplied to the filter main body.

In one or more embodiments, because of the liquid separation unit, the fluid flows into the filter main body in a state where the liquid has been removed in advance from the fluid (or the external fluid). Accordingly, the fluid does not flow in toward the heater with the liquid contained. As a result, it is not necessary to raise the temperature of the liquid in the fluid with the heater, and energy such as electric power required for the heater can be reduced. Accordingly, power required for the filter with an integrated heater can be reduced. In addition, blocking of a hole in the filter main body can be suppressed since the liquid is removed from fluid, and thus the particle collection capacity of the filter main body can be sufficiently exhibited. Furthermore, a pressure loss at a time when the fluid passes through the filter main body can be reduced.

A rotary machine system according to one or more embodiments of the present invention includes a rotary machine through which a fluid circulates, the filter with an integrated heater described above, which takes in the portion of the fluid from the rotary machine or the external fluid and generates the seal gas, and a gas seal device disposed in the rotary machine and performing the sealing of the fluid in the rotary machine by using the seal gas.

According to this rotary machine system of one or more embodiments, when the seal gas is generated, the filter with an integrated heater is used that integrally accommodates the filter main body and the heater in the casing. Accordingly, the filter main body and the heater do not have to be installed in different spaces.

Advantageous Effects of Invention

In one or more embodiments, with the filter with an integrated heater and the rotary machine system described above, a space-saving effect can be achieved since the filter main body and the heater are accommodated in the casing in an integrated manner.

DETAILED DESCRIPTION

Hereinafter, a compressor system (rotary machine system) 1 according to a first example of one or more embodiments of the present invention will be described.

Figure 1:
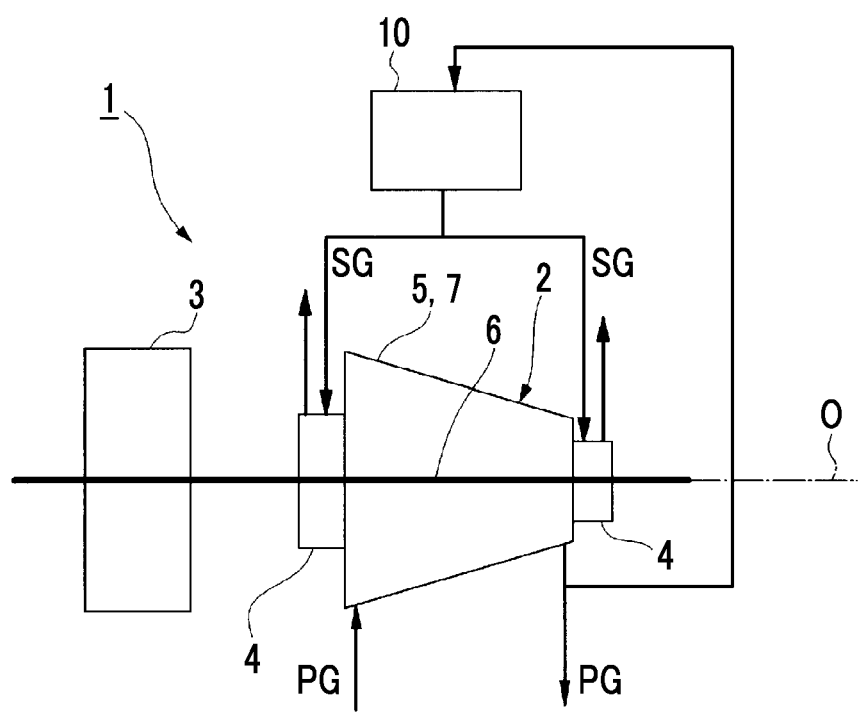
FIG. 1 is an overall configuration diagram schematically illustrating a compressor system according to a first example of one or more embodiments of the present invention.

As illustrated in FIG. 1, the compressor system 1 is provided with a compressor (rotary machine) 2 compressing a process gas (fluid) PG, a driving source 3 driving the compressor 2, a filter 10 with an integrated heater generating a seal gas SG from some of the process gas PG, and gas seal devices 4 disposed on the compressor 2. The seal gas SG is supplied to the gas seal devices 4 from the filter 10 with an integrated heater.

The compressor 2 is, for example, a centrifugal compressor. The compressor 2 is provided with a compressor casing 5, a rotary shaft 6 disposed to be covered by the compressor casing 5 and protrude from the compressor casing 5 and rotating relative to the compressor casing 5, and a compression portion 7 such as an impeller rotating integrally with the rotary shaft 6 and compressing the process gas PG in the compressor casing 5.

The process gas PG is suctioned from one end side of the compressor casing 5 in the direction of an axis O of the rotary shaft 6 and the process gas PG is ejected from the other end side after being compressed.

Examples of the driving source 3 include an electric motor and a steam turbine. The driving source 3 provides rotational power for the rotation of the rotary shaft 6.

The gas seal devices 4 are provided at both shaft ends of the compressor casing 5 in the direction of the axis O of the rotary shaft 6. The gas seal devices 4 are attached to the compressor casing 5 to cover the rotary shaft 6 from its outer periphery. The gas seal devices 4 have a seal function, blocking the leakage of the process gas PG from a gap between the compressor casing 5 and the rotary shaft 6 by means of the seal gas SG generated in the filter 10 with an integrated heater.

Figure 2:
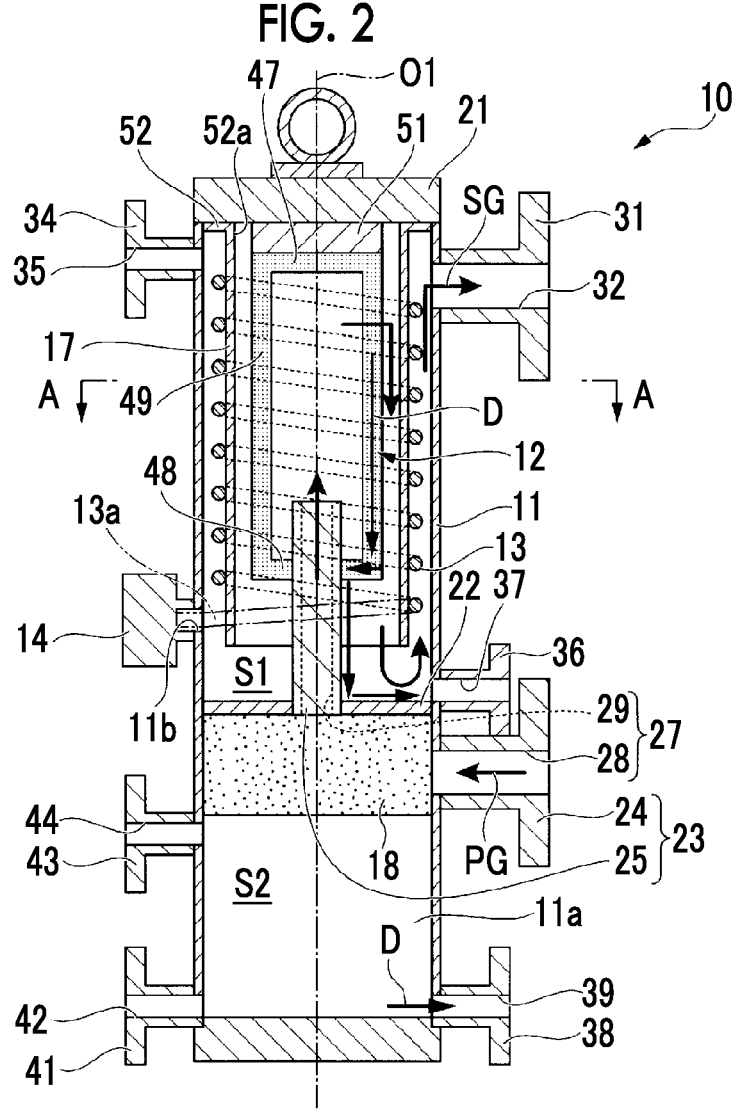
FIG. 2 is a longitudinal sectional view illustrating a filter with an integrated heater in the compressor system according to the first example of one or more embodiments of the present invention.
Figure 3:
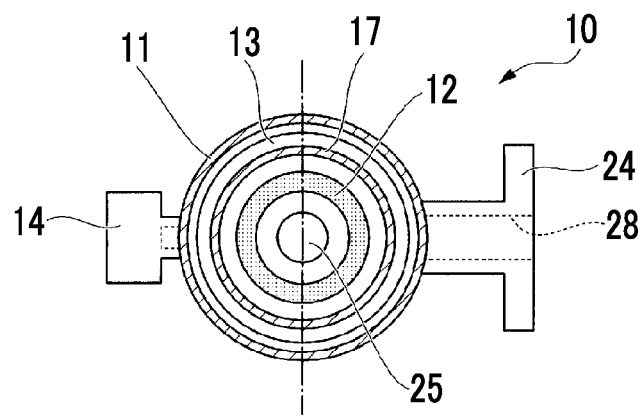
FIG. 3 is a cross sectional view illustrating the filter with an integrated heater in the compressor system according to the first example of one or more embodiment of the present inventions, which shows a cross section taken along line A-A of FIG. 2.

The filter 10 with an integrated heater will be described below with reference to FIGS. 2 and 3.

The filter 10 with an integrated heater is provided with a casing 11 that has a tubular shape, a filter main body 12 (filter element) accommodated in the casing 11, a heater 13 covering the filter main body 12 in the casing 11, a baffle plate (partition member) 17 placed between the filter main body and the heater 13 in the casing 11, and a mist separator (liquid separation unit) 18 placed inside a lower portion of the casing 11.

The casing 11 has the shape of a bottomed cylinder about an axis O1. An opening-closing lid 21 is disposed in an upper portion of the casing 11. The opening-closing lid 21 has the shape of a disc about the axis O1 and allows an inner portion of the casing 11 to be open.

In addition, a disc-shaped partition plate 22 is disposed at a middle position in the casing 11 in the direction of the axis O1 and the partition plate 22 partitions the inner space into two, upper and lower, spaces (upper space S1 and lower space S2).

In the first example of one or more embodiments, the opening-closing lid 21 is disposed only in the upper portion. However, the lower portion of the casing 11 may also be openable by means of an opening-closing lid.

According to a specific method for forming the casing 11, a projection (not illustrated) that protrudes toward the axis O1 from an inner surface of the casing 11 is formed at a middle position in the direction in which the cylindrical casing 11 extends in a case where the opening-closing lid 21 is disposed only in the upper portion as in the first example of one or more embodiments and in a case where opening-closing lids are disposed both in the upper and lower portions. The partition plate 22 is disposed and placed on the projection. In the case where the opening-closing lids are disposed both in the upper and lower portions, the partition plate 22 and the casing 11 can be formed to be integrated with each other by a columnar member being cut from above and below to be hollowed out with the partition plate 22 left as it is.

A suction port 23 is disposed in the casing 11 as well. The suction port 23 has a supply port portion 24, which is disposed below the position in the casing 11 where the partition plate 22 is disposed, and a supply nozzle 25, which extends upwards from the partition plate 22.

The supply port portion 24 protrudes radially outwards from an outer peripheral surface of the casing 11 below the position in the casing 11 where the partition plate 22 is disposed. A first supply flow path 28 is formed on the outer peripheral surface of the casing 11 and in the supply port portion 24, and the first supply flow path 28 extends in a radial direction of the casing 11, allows the inside and the outside of the casing 11 to communicate with each other, and is open toward the lower space S2.

The supply nozzle 25 has the shape of a pipe and extends upwards coaxially with the axis O1 up to a position where it is not in contact with the opening-closing lid 21. A second supply flow path 29 is formed in an up-down direction through the supply nozzle 25 and the partition plate 22, and the second supply flow path 29 allows the upper space S1 and the lower space S2 to communicate with each other.

As illustrated in FIG. 1, some of the process gas PG from an ejection side of the compressor 2 is introduced into the first supply flow path 28 and this process gas PG is supplied from the second supply flow path 29 to the upper space S1. In other words, a suction flow path 27 for the process gas PG is formed by the first supply flow path 28 and the second supply flow path 29.

An ejection port 31 is disposed on the casing 11 as well. The ejection port 31 protrudes radially outwards from the outer peripheral surface in the upper portion of the casing 11. An ejection flow path 32 is formed on the outer peripheral surface of the casing 11 and at the ejection port 31, and the ejection flow path 32 extends in the radial direction of the casing 11, allows the inside and the outside of the casing 11 to communicate with each other, and is open toward the upper space S1. In the first example of one or more embodiments, the ejection port 31 and the ejection flow path 32 are disposed at substantially the same positions as the supply port portion 24 and the first supply flow path 28 in a circumferential direction of the casing 11.

Also disposed in the casing 11 is a ventilation port 34, which protrudes radially outwards from the outer peripheral surface at a position that is substantially the same as the ejection port 31 in the up-down direction (direction of the axis O1) and separated from it in the circumferential direction. A ventilation flow path 35 is formed on the outer peripheral surface of the casing 11 and at the ventilation port 34, and the ventilation flow path 35 extends in the radial direction of the casing 11, allows the inside and the outside of the casing 11 to communicate with each other, and is open toward the upper space S1.

Also disposed in the casing 11 is a drain discharge port 38, which protrudes radially outwards from the outer peripheral surface further below the position where the supply port portion 24 is disposed. A discharge flow path 39 is formed on the outer peripheral surface of the casing 11 and at the drain discharge port 38, and the discharge flow path 39 extends in the radial direction of the casing 11, allows the inside and the outside of the casing 11 to communicate with each other, and is open toward the lower space S2. A drain D gathering in the lower portion of the casing 11 (liquid removed from the process gas PG, described later) can be discharged to the outside of the casing 11 from the discharge flow path 39.

Also disposed in the casing 11 is an upper drain discharge port 36, which protrudes radially outwards from the outer peripheral surface of the casing 11 above the first supply flow path 28. An upper discharge flow path 37 formed on the outer peripheral surface of the casing 11 and at the upper drain discharge port 36, and the upper discharge flow path 37 extends in the radial direction of the casing 11, allows the inside and the outside of the casing 11 to communicate with each other, and is open toward the upper space S1 at a position adjacent to the partition plate 22. In some cases, the liquid of the process gas PG becomes the drain D and gathers in an upper portion of the partition plate 22 after flowing on outer surfaces of the filter main body 12 and the supply nozzle 25. The upper discharge flow path 37 is capable of discharging the drain D gathering in the upper portion of the partition plate 22 to the outside of the casing 11.

Also disposed in the casing 11 is a lower drain level measurement port 41, which protrudes radially outwards from the outer peripheral surface of the casing 11 at a position that is substantially the same as the drain discharge port 38 in the up-down direction and separated from it in the circumferential direction. A lower measurement flow path 42 is formed on the outer peripheral surface of the casing 11 and at the lower drain level measurement port 41, and the lower measurement flow path 42 extends in the radial direction of the casing 11, allows the inside and the outside of the casing 11 to communicate with each other, and is open toward the lower space S2. The amount (water level) of the drain D gathering in the lower space S2 can be measured by the lower drain level measurement port 41.

Likewise, an upper drain level measurement port 43, which protrudes radially outwards from the outer peripheral surface of the casing 11, is disposed above the lower drain level measurement port 41 and below the partition plate 22. An upper measurement flow path 44 is formed on the outer peripheral surface of the casing 11 and at the upper drain level measurement port 43, and the upper measurement flow path 44 extends in the radial direction of the casing 11, allows the inside and the outside of the casing 11 to communicate with each other, and is open toward the lower space S2. The amount (water level) of the drain D gathering in the lower space S2 can be measured by the upper drain level measurement port 43 as well.

The filter main body 12 is formed from stainless steel and a heat-resistant fiber such as a silicon carbide fiber, an alumina fiber, and a ceramic fiber.

The filter main body 12 has the shape of a bottomed cylinder and has an upper bottom portion 47, a lower bottom portion 48, and a cylindrical portion 49. The filter main body 12 is placed in the upper space S1 coaxially with the axis O1 of the casing 11.

The upper bottom portion 47 is fixed to the opening-closing lid 21 via an attachment bracket 51, which is disposed on a lower surface of the opening-closing lid 21.

The supply nozzle 25 penetrates the lower bottom portion 48 and the supply nozzle 25 extends up to a middle position in the cylindrical portion 49 in the up-down direction. As a result, the second supply flow path 29 of the supply nozzle 25 is open toward an inner portion of the filter main body 12.

The baffle plate 17 has a cylindrical shape and is placed in the upper space S1 coaxially with the axis O1 of the casing 11.

In addition, the baffle plate 17 is placed such that it is radially sandwiched between the casing 11 and the filter main body 12 with radial gaps present between an inner peripheral surface of the casing 11 and itself and between an outer peripheral surface of the filter main body 12 and itself so that the baffle plate 17 comes into contact with neither the inner peripheral surface of the casing 11 nor the outer peripheral surface of the filter main body 12.

An insertion hole 52a for insertion of the attachment bracket 51 is integrally formed in an upper end portion of the baffle plate 17. An attachment flange 52, which has a disc shape about the axis O1, is also disposed in the upper end portion. This attachment flange 52 is detachably attached to the lower surface of the opening-closing lid 21 by means of a bolt (not illustrated) or the like.

The heater 13 is disposed in the casing 11 such that it covers an outer peripheral surface of the baffle plate 17, that is, such that it covers the filter main body 12 from its outer periphery side. In the first example of one or more embodiments, the heater 13 is a coil heater that is wrapped around and fixed to the outer peripheral surface of the baffle plate 17 and is placed with its central axis coaxial with the axis O1. More specifically, the heater 13 has the shape of a spiral line twisted from an upper part, which is one side of the axis O1 of the filter main body 12, to a lower part, which is the other side of the axis O1 of the filter main body 12, toward one part of the cylindrical portion 49 of the filter main body 12 in the circumferential direction.

The heater 13 may be in contact with the outer peripheral surface of the baffle plate 17. Alternatively, the heater 13 may be, for example, fixed to the opening-closing lid 21 and placed in a state where a gap is present between the outer peripheral surface of the baffle plate 17 and itself without being in contact with the outer peripheral surface of the baffle plate 17.

The heater 13 has a connection line portion 13a. The connection line portion 13a extends to the outside of the casing 11 through a through-hole 11b, which allows the inside and the outside of the casing 11 to communicate with each other in a lower portion of the upper space S1. The connection line portion 13a allows the heater 13 to be connected to a power supply device 14 (connection terminal box and power source) that is attached to the outer peripheral surface of the casing 11. The heater 13 allows the temperature of the process gas PG to rise and reach a temperature that is higher than a dew point temperature by a margin of at least 20 degrees Celsius. The connection line portion 13a may penetrate the opening-closing lid 21. In this case, the power supply device 14 may be integrated with the opening-closing lid 21.

In this manner, the heater 13 is disposed between the filter main body 12 and the ejection port 31 in the casing 11 and the baffle plate 17 is disposed between the heater 13 and the filter main body 12.

A cyclone-type mist separator in which a spiral-shaped flow path is formed is an example of what is adopted as the mist separator 18. This mist separator 18 is disposed in the lower space S2 at a position adjacent to the partition plate 22 and between the second supply flow path 29 and the first supply flow path 28 of the suction port 23. This mist separator 18 removes the liquid from the process gas PG flowing in from the supply port portion 24 and stores the liquid (drain D) in a drain portion 11a in the lower portion of the casing 11 after the removal. The liquid stored in the drain portion 11a is discharged to the outside of the casing 11 through the drain discharge port 38.

In the compressor system 1 according to the first example of one or more embodiments described above, the process gas PG from the compressor 2 taken in from the supply port portion 24 flows into the supply nozzle 25 through the mist separator 18 and flows into the filter main body 12 from the supply nozzle 25.

In the mist separator 18, the liquid is removed from the process gas PG, the process gas PG becomes a dry gas, and then it flows into the supply nozzle 25. After the removal, the liquid drops downwards in the casing 11 and is stored in the drain portion 11a. The process gas PG flowing out from the supply nozzle 25 passes through the filter main body 12 from the inner portion of the filter main body 12. Then, it comes into contact with the baffle plate 17. Then, the process gas PG circulates downwards through the gap between the baffle plate 17 and the cylindrical portion 49 of the filter main body to spread along an inner surface (surface) of the baffle plate 17.

Then, the process gas PG is reflected by the partition plate 22 and circulates upwards through the gap between the baffle plate 17 and the casing 11. During the course of the circulation, the temperature of the process gas PG rises as it comes into contact with the heater 13. Then, it becomes the seal gas SG and is ejected to the outside of the casing 11 from the ejection flow path 32 (ejection port 31).

Through this procedure, the process gas PG passes through the filter main body 12 and is purified by foreign matter being removed from the process gas PG. After the purification, the temperature of the process gas PG is raised by the heater 13. Accordingly, the process gas PG becomes the seal gas SG and is ejected from the ejection port 31 in a state where the process gas PG is maintained at a temperature exceeding the dew point temperature. Accordingly, the seal gas SG can be supplied to the gas seal devices 4 in the form of a dry gas, sealing of the process gas PG in the compressor 2 can be performed, and the operation efficiency of the compressor 2 can be improved.

When the seal gas SG is generated, the filter 10 with an integrated heater is used that integrally accommodates the filter main body 12 and the heater 13, which is disposed to cover the filter main body 12, in the casing 11. Accordingly, the filter main body 12 and the heater 13 do not have to be installed in different spaces, and a space-saving effect can be achieved.

Since the cylindrical filter main body 12 is disposed and the filter main body 12 is covered by the heater 13, the process gas PG, which circulates radially outwards from the inner portion of the filter main body 12, can be firmly in contact with the heater 13 and liquefaction attributable to a decline in the temperature of the ejected process gas PG (seal gas SG) can be suppressed. By the liquefaction-suppressed seal gas SG being used as described above, the compressor 2 is capable of exhibiting a sufficient seal effect.

In the first example of one or more embodiments, in particular, the process gas PG does not directly head for the heater 13 and the ejection port 31 after passing through the filter main body 12 since the baffle plate 17 is disposed and the flow of the process gas PG is temporarily interrupted by the baffle plate 17. Accordingly, the process gas PG that has passed through the filter main body 12 along the inner surface of the baffle plate 17 heads for the heater 13 after circulating to spread along the inner surface of the baffle plate 17.

Accordingly, the process gas PG can be spread over a wide range of the heater 13, that is, over a wide range in the up-down direction, and the area of contact between the heater 13 and the process gas PG can be increased and the effect of the rise in the temperature of the process gas PG can be enhanced. In other words, the process gas PG can be ejected from the ejection port 31 after heat exchange is reliably performed between the process gas PG and the heater 13.

Since the heater 13 is the coil heater, the heater 13 can be installed with ease by being wrapped around the baffle plate 17. Alternatively, the heater 13 can be installed with ease by the heater 13 being fixed to the opening-closing lid 21.

Since the mist separator 18 is disposed, the liquid can be removed in advance from the process gas PG before the process gas PG flows into the filter main body 12. Accordingly, the process gas PG does not flow in toward the heater 13 with the liquid contained. As a result, it is not necessary to raise the temperature of the liquid in the process gas PG with the heater 13, and energy such as electric power required for the heater 13 can be reduced. Accordingly, power required for the filter 10 with an integrated heater can be reduced.

In addition, blocking of a hole in the filter main body 12 by the liquid can be suppressed since the liquid is removed from the process gas PG, and thus the particle collection capacity of the filter main body 12 can be sufficiently exhibited. Furthermore, a pressure loss at a time when the process gas PG passes through the filter main body 12 can be reduced.

Figure 4:
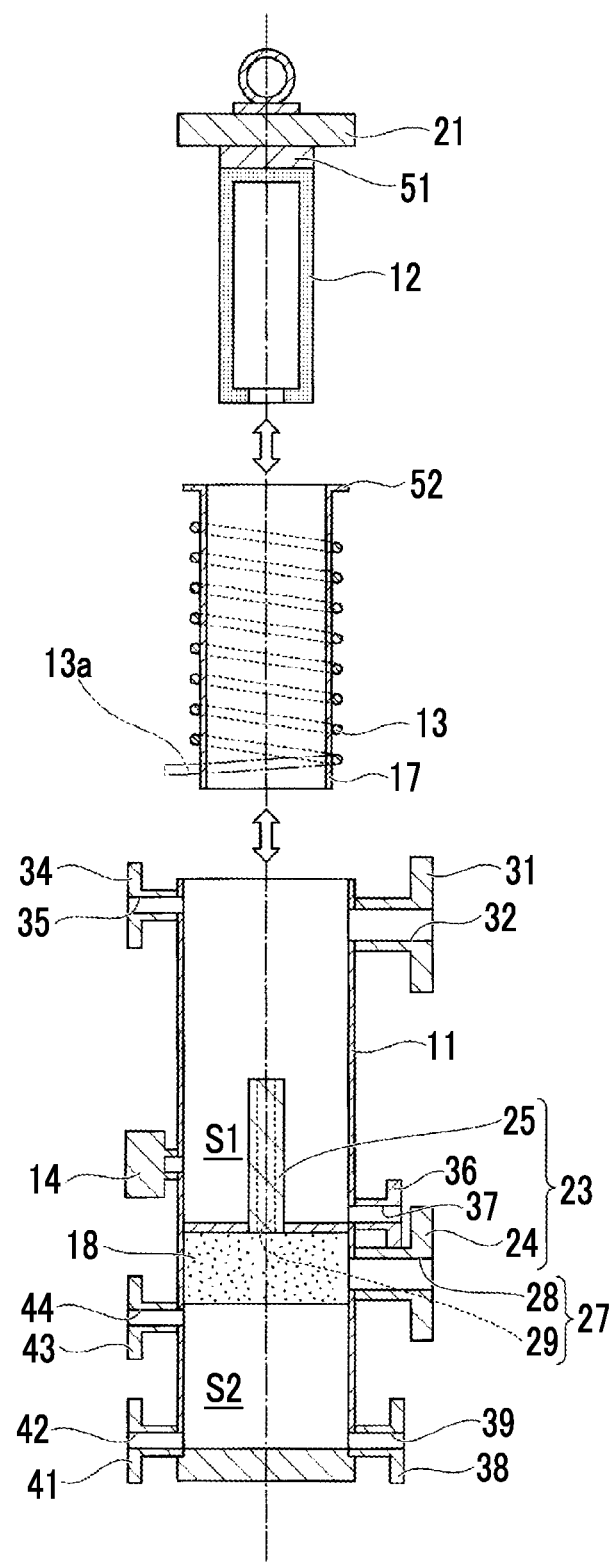
FIG. 4 is an exploded view illustrating the filter with an integrated heater in the compressor system according to the first example of one or more embodiments of the present invention.

The filter main body 12 is fixed to the opening-closing lid 21 by the attachment bracket 51 and the baffle plate 17 (and the heater 13) is detachably attached to the opening-closing lid 21 by the attachment flange 52. Accordingly, only the opening-closing lid 21 and the filter main body 12 can be pulled out from the casing 11 simply by removing the attachment flange 52 from the opening-closing lid 21 and removing the opening-closing lid 21 from the casing 11 as illustrated in FIG. 4. Accordingly, the filter main body 12 can be easily exchanged.

After only the opening-closing lid 21 and the filter main body 12 are pulled out from the casing 11, the attachment flange 52, the baffle plate 17, and the heater 13 can be easily pulled out from the casing 11 as illustrated in FIG. 4.

Since the heater 13 is disposed coaxially with the filter main body 12, the heater 13 and the filter main body 12 can be given a uniform gap in the circumferential direction. Accordingly, the process gas PG that has passed through the filter main body 12 can be uniformly circulated through the gap between the heater 13 and the filter main body 12 and the heat exchange between the process gas PG and the heater 13 can be performed in an efficient way.

The baffle plate 17 according to the first example of one or more embodiments is optional. In other words, the filter main body 12 and the heater 13, which is disposed to cover the filter main body 12, may be accommodated in the casing 11.

Figure 5:
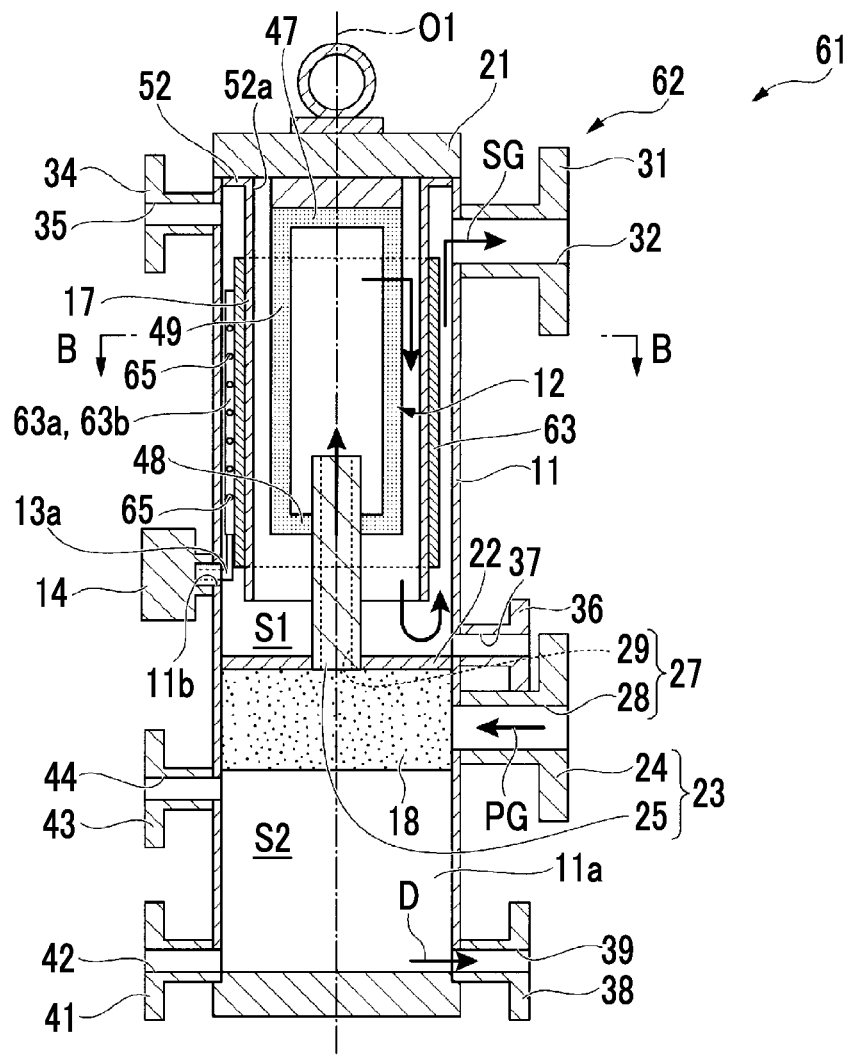
FIG. 5 is a longitudinal sectional view illustrating a filter with an integrated heater in a compressor system according to a second example of one or more embodiments of the present invention.
Figure 6:
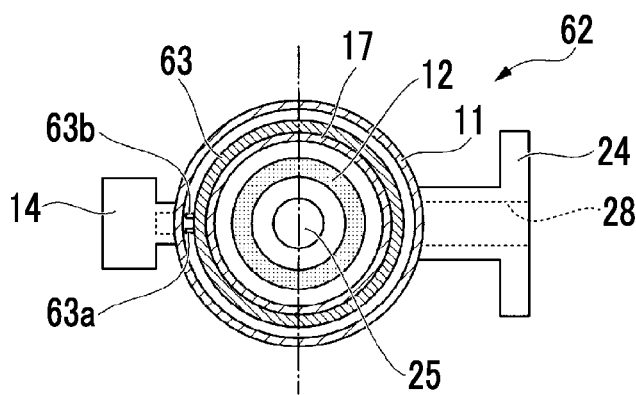
FIG. 6 is a cross sectional view illustrating the filter with an integrated heater in the compressor system according to the second example of one or more embodiments of the present invention, which shows a cross section taken along line B-B of FIG. 5.

Hereinafter, a second example of one or more embodiments of the present invention will be described with reference to FIGS. 5 and 6.

The same reference numerals will be used to refer to components similar to those of the first example of one or more embodiments and detailed description thereof will be omitted.

In a compressor system 61 according to the second example of one or more embodiments, the shape of a heater 63 in a filter 62 with an integrated heater differs from that of the first example of one or more embodiments.

The heater 63 has a cylindrical shape. The heater 63 is disposed in contact with the outer peripheral surface of the baffle plate 17 such that its central axis is positioned coaxially with the axis O1.

Although not illustrated in the drawings, the heater 63 has a gap formed at a part in the circumferential direction in a state where it has yet to be attached to the baffle plate 17, which results in its cross section orthogonal to the central axis having a C shape.

Attachment plate portions 63a and 63b, which extend along the central axis, are formed on one side and the other side of the heater 63 across this gap. In a state where the heater 63 covers the baffle plate 17 from the outer peripheral surface of the baffle plate 17, the heater 63 is fixed to the baffle plate by bolts 65 being fastened after being inserted in a tangential direction of the heater 63 across the space between these attachment plate portions 63a and 63b.

In the second example of one or more embodiments, the heater 63 has a dimension that allows the baffle plate 17 to slightly protrude upwards and downwards.

The compressor system 61 according to the second example of one or more embodiments described above uses the cylindrical heater 63, and thus a wide range of the outer peripheral surface of the filter main body 12 can be covered. Accordingly, the area of contact between the heater 63 and the process gas PG that has passed through the filter main body 12 can be increased and the temperature of the process gas PG can be raised with reliability. As a result, the effect of suppressing condensation of the seal gas SG can be enhanced.

Heat conduction occurs between the baffle plate 17 and the heater 63 since the baffle plate 17 and the heater 63 are in contact with each other. Accordingly, the temperature of the baffle plate 17 is raised and heat transfer occurs between the baffle plate 17 and the process gas PG circulating along the inner surface of the baffle plate 17 as well. Therefore, the temperature of the process gas PG can be raised with greater efficiency.

Since the heater 63 is attached to the baffle plate 17 by the bolts 65, it can be easily removed from the baffle plate 17.

Figure 7:
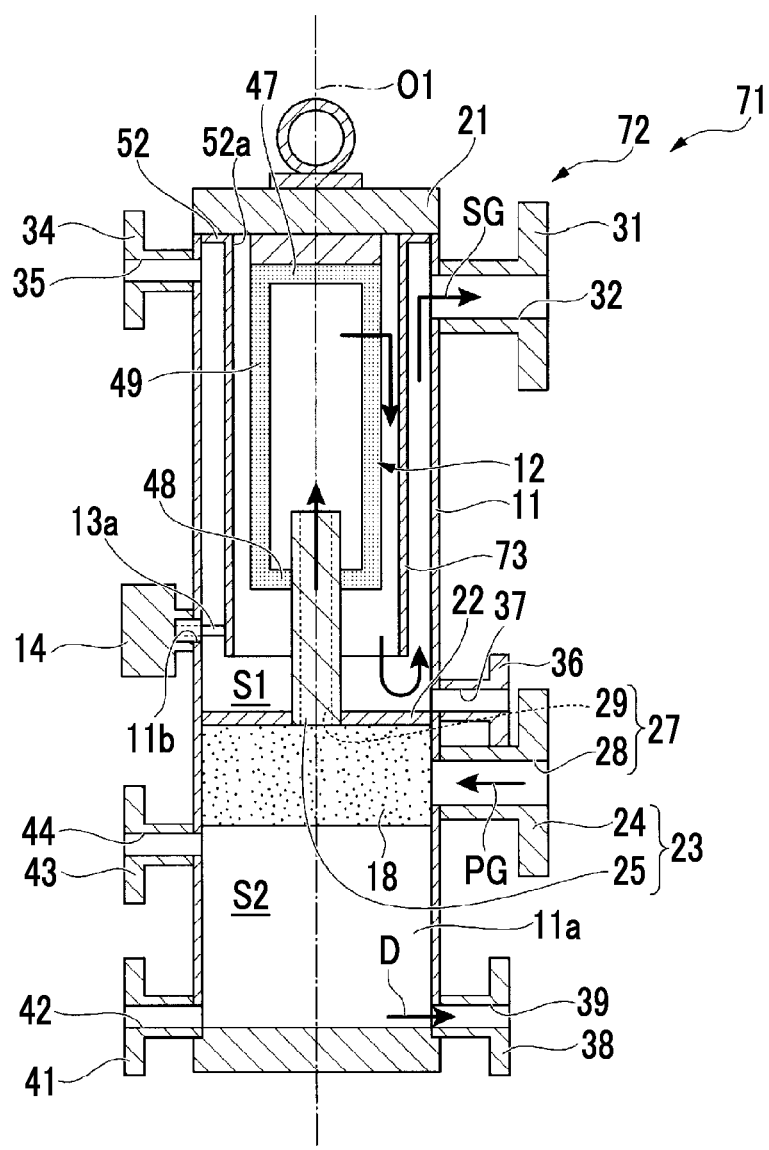
FIG. 7 is a longitudinal sectional view illustrating a filter with an integrated heater in a compressor system according to a third example of one or more embodiments of the present invention.

Hereinafter, a third example of one or more embodiments of the present invention will be described with reference to FIG. 7.

The same reference numerals will be used to refer to components similar to those of the first and second examples of one or more embodiments and detailed description thereof will be omitted.

In a compressor system 71 according to the third example of one or more embodiments, the shape of a heater 73 of a filter 72 with an integrated heater differs from those of the first and second examples of one or more embodiments.

The baffle plate 17 according to the first and second examples of one or more embodiments is not disposed in the third example of one or more embodiments.

Instead, the heater 73 has a cylindrical shape as in the case with the baffle plate 17 and is placed in the upper space S1 of the casing 11 such that its central axis is positioned coaxially with the axis O1 of the filter main body 12. A plate heater that is formed into a cylindrical shape is an example of what is used as the heater 73.

The heater 73 is placed between the casing 11 and the filter main body 12 such that it is radially sandwiched between the casing 11 and the filter main body 12 with radial gaps present so that the heater 73 comes into contact with neither the casing 11 nor the filter main body 12.

The heater 73 is fixed to the attachment flange 52, which is detachably attached to the lower surface of the opening-closing lid 21 by means of a bolt (not illustrated) or the like.

The compressor system 71 according to the third example of one or more embodiments described above uses the cylindrical heater 73, and thus the area of contact with the process gas PG can be increased. Accordingly, the temperature of the process gas PG can be raised with reliability. As a result, the effect of suppressing condensation of the seal gas SG can be enhanced.

In addition, the number of components constituting the filter 72 with an integrated heater can be smaller than in the first and second examples of one or more embodiments, and thus maintainability can be improved and cost reduction can be achieved.

Figure 8:
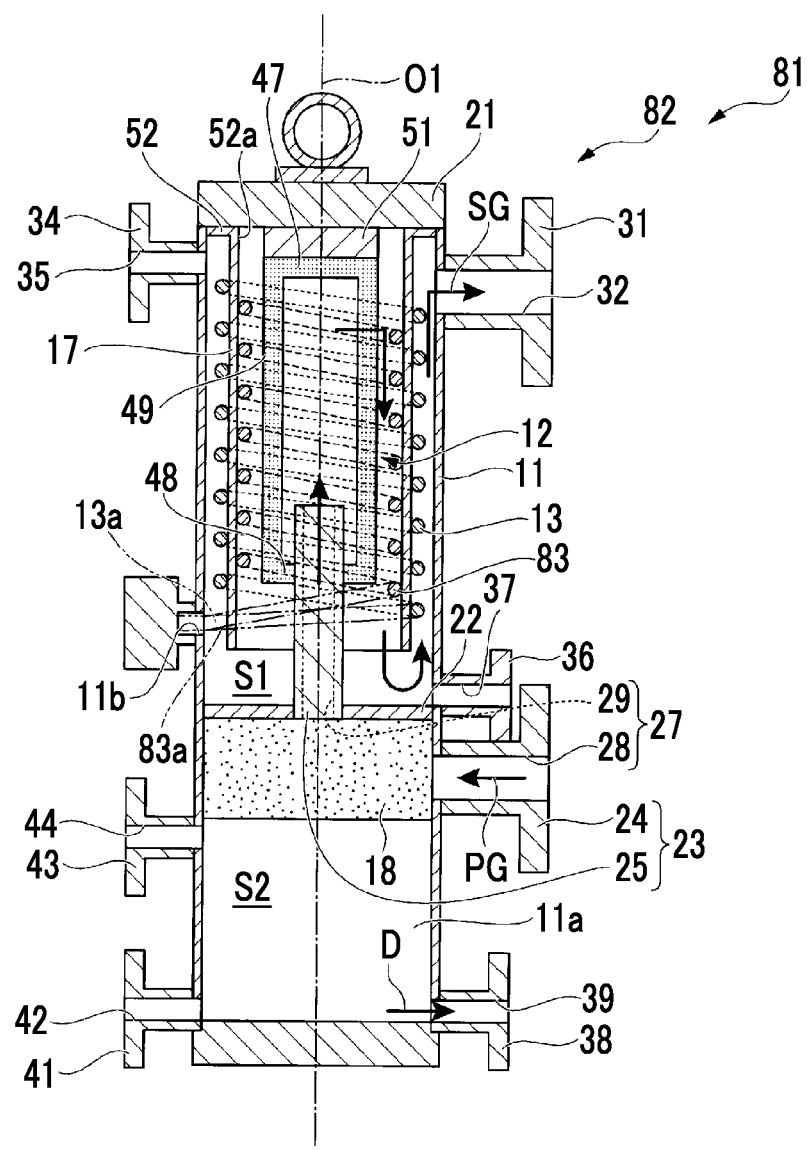
FIG. 8 is a longitudinal sectional view illustrating a filter with an integrated heater in a compressor system according to a fourth example of one or more embodiments of the present invention.

Hereinafter, a fourth example of one or more embodiments of the present invention will be described with reference to FIG. 8.

The same reference numerals will be used to refer to components similar to those of the first to third examples of one or more embodiments and detailed description thereof will be omitted.

In a compressor system 81 according to the fourth example of one or more embodiments, the filter 10 with an integrated heater according to the first example of one or more embodiments is provided with an inside heater 83 as well as the heater 13.

The inside heater 83 is disposed between the baffle plate and the filter main body 12 in the upper space S1 of the casing 11. Specifically, the inside heater 83 is fixed to an inner peripheral surface of the baffle plate 17. The inside heater 83 may be disposed below the filter main body 12 inside the baffle plate 17 as well.

The inside heater 83 is a coil heater similar to the heater 13. The inside heater 83 has the shape of a spiral line twisted from an upper part, which is one side of the axis O1 of the filter main body 12, to a lower part, which is the other side of the axis O1 of the filter main body 12, toward one part of the cylindrical portion 49 of the filter main body 12 in the circumferential direction. The inside heater 83 is connected to the power supply device 14 via a connection line portion 83a.

The connection line portion 83a may penetrate the opening-closing lid 21 as described in the first example of one or more embodiments. In this case, the power supply device 14 can be integrated with the opening-closing lid 21.

In the compressor system 81 according to the fourth example of one or more embodiments described above, the temperature of the process gas PG that has passed through the filter main body 12 can be raised in two stages by the inside heater 83 and the heater 13. In other words, the temperature of the process gas PG is raised first by the inside heater 83 when the process gas PG circulates through the gap between the baffle plate 17 and the filter main body 12, and then the temperature of the process gas PG is raised by the heater 13 when the process gas PG circulates through the gap between the baffle plate 17 and the casing 11.

Accordingly, the size of the casing does not have to be increased even in a case where the amount of increase in temperature that is required for the process gas PG increases.

In addition, the effect of a decline in the temperature of the process gas PG during the circulation of the process gas PG along the inner surface of the baffle plate 17 can be reduced, and thus the effect of the rise in the temperature of the process gas PG can be improved.

The inside heater 83 according to the fourth example of one or more embodiments is not limited to the coil heater.

For example, it may be one with a cylindrical shape like the heater 63 according to the second example of one or more embodiments and the heater 73 according to the third example of one or more embodiments.

Although the disclosure has been described with respect to only a limited number of embodiments, those skilled in the art, having benefit of this disclosure, will appreciate that carious other embodiments may be devised without departing from the scope of the present invention. Accordingly, the scope of the invention should be limited by only the attached claims.

For example, in one or more embodiments, the filter main body 12 may be covered in part by the heater 13 (63, 73). In other words, a plurality of plate-shaped heaters separated from each other in the circumferential direction of the filter main body 12 may be placed between the filter main body 12 and the casing 11.

In addition, in one or more embodiments, the baffle plate 17 may not have the cylindrical shape and may not cover the entire filter main body 12. In other words, a plurality of flat plate-shaped members separated from each other in the circumferential direction of the filter main body 12 may be placed between the filter main body 12 and the heater 13 (63, 73)

According to one or more embodiments, the filter main body 12 is not limited to the case where it has the cylindrical shape. The filter main body 12 may have the shape of a square tube or the like as well.

According to one or more embodiments, the mist separator 18 is optional. For example, the mist separator 18 will not be necessary if the process gas PG is a dried gas.

According to one or more embodiments, two units of the filter 10 (62, 72, 82) with an integrated heater may be disposed in parallel for one of the two to be used during maintenance of the other one.

In the embodiments described above, the seal gas SG is generated from some of the process gas PG from the ejection side of the compressor 2. The seal gas SG may also be generated by an external fluid being taken in. Examples of the external fluid include the process gas PG (external process gas PG) that has yet to be taken into the compressor system 1 (61, 71, 81) and a fluid outside the system that differs from the process gas PG.

INDUSTRIAL APPLICABILITY

The compressor system of one or more embodiments described above is capable of achieving a space-saving effect by accommodating the filter main body and the heater in the casing in an integrated manner.

REFERENCE SIGNS LIST 1, 61, 71, 81 Compressor system (rotary machine system)
2 Compressor (rotary machine)
3 Driving source
4 Gas seal device
5 Compressor casing
6 Rotary shaft
7 Compression portion
10, 62, 72, 82 Filter with integrated heater
11 Casing
11a Drain portion
11b Through-hole
12 Filter main body (filter element)
13, 63, 73 Heater
13a Connection line portion
14 Power supply device (connection terminal box and power source)
17 Baffle plate (partition member)
18 Mist separator (liquid separation unit)
21 Opening-closing lid
22 Partition plate
23 Suction port
24 Supply port portion
25 Supply nozzle
27 Suction flow path
28 First supply flow path
29 Second supply flow path
31 Ejection port
32 Ejection flow path
34 Ventilation port
35 Ventilation flow path
36 Upper drain discharge port
37 Upper discharge flow path
38 Drain discharge port
39 Discharge flow path
41 Lower drain level measurement port
42 Lower measurement flow path
43 Upper drain level measurement port
44 Upper measurement flow path
47 Upper bottom portion
48 Lower bottom portion
49 Cylindrical portion
51 Attachment bracket
52 Attachment flange
52a Insertion hole
63a, 63b Attachment plate portion
65 Bolt
83 Inside heater
83a Connection line portion
PG Process gas (fluid)
SG Seal gas
O Axis
O1 Axis
S1 Upper space
S2 Lower space
D Drain

The invention claimed is:

1. A filter with an integrated heater that takes in a portion of a fluid of a rotary machine or an external fluid and generates a seal gas that seals the fluid in the rotary machine, the filter with an integrated heater comprising:
a casing comprising a suction port and an ejection port, wherein
the suction port takes in the portion of the fluid or the external fluid from the rotary machine, and
the ejection port ejects the fluid or the external fluid;
a filter main body disposed in the casing, wherein the fluid or the external fluid from the suction port passes through the filter main body;
a heater disposed between the filter main body and the ejection port in the casing; and
a partition member placed between the filter main body and the heater in the casing with a gap present between the filter main body and the partition member and interrupting a flow of the fluid or the external fluid from the filter main body to the heater.

2. The filter with an integrated heater according to claim 1, wherein
the filter main body has a cylindrical shape about an axis,
the suction port is open toward an inner portion of the filter main body on one side of the filter main body in a direction of the axis, and the heater is disposed to cover the filter main body from an outer periphery side.

3. The filter with an integrated heater according to claim 2, wherein the heater has a shape of a spiral line twisted from one part of the axis toward the other part of the axis toward one part of the filter main body in a circumferential direction and is disposed to cover the filter main body from the outer periphery side.

4. The filter with an integrated heater according to claim 2, wherein the heater has a cylindrical shape about the axis.

5. The filter with an integrated heater according to claim 1, further comprising:
an inside heater disposed on the filter main body side,
wherein the filter main body side is an inner side of the partition member.

6. The filter with an integrated heater according to claim 1, further comprising:
a liquid separation unit that removes a liquid from the fluid or the external fluid supplied to the filter main body.

7. A rotary machine system comprising:
a rotary machine through which a fluid circulates;
the filter with an integrated heater according to claim 1, which takes in the portion of the fluid from the rotary machine or the external fluid and generates the seal gas; and
a gas seal device disposed in the rotary machine that seals the fluid in the rotary machine using the seal gas.

8. A filter with an integrated heater that takes in a portion of a fluid of a rotary machine or an external fluid and generates a seal gas that seals the fluid in the rotary machine, the filter with an integrated heater comprising:
a casing comprising a suction port and an ejection port, wherein
the suction port takes in the portion of the fluid or the external fluid from the rotary machine, and
the ejection port ejects the fluid or the external fluid;
a filter main body disposed in the casing, wherein the fluid or the external fluid from the suction port passes through the filter main body; and
a heater disposed between the filter main body and the ejection port in the casing, wherein
the filter main body has a cylindrical shape about an axis,
the suction port is open toward an inner portion of the filter main body on one side of the filter main body in a direction of the axis, and
the heater is disposed to cover the filter main body from an outer periphery side, has a cylindrical shape about the axis, and interrupts a flow of the fluid or the external fluid from the filter main body to the heater.

* * * * *